April 9, 1968  W. L. GASNER  3,376,906
ROUTER CUTTER WITH RELIEVED OUTER TOE SURFACE
Filed Feb. 15, 1966  2 Sheets-Sheet 1
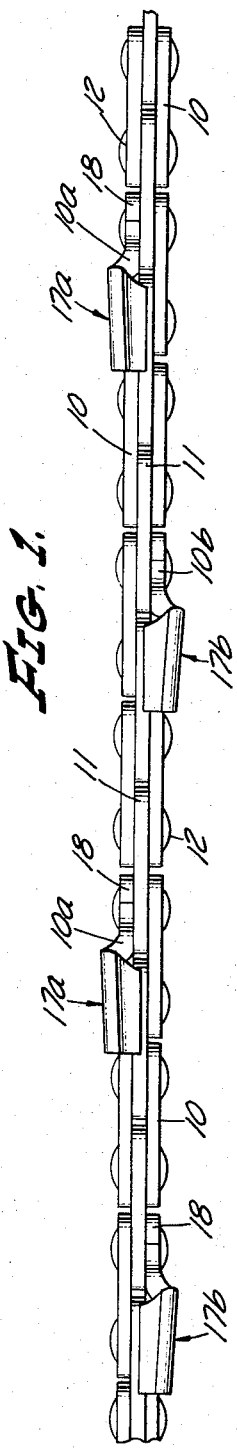
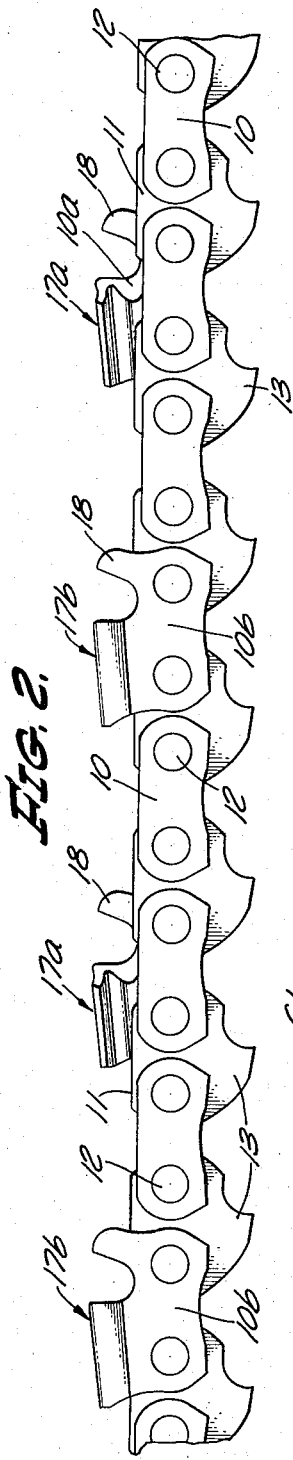
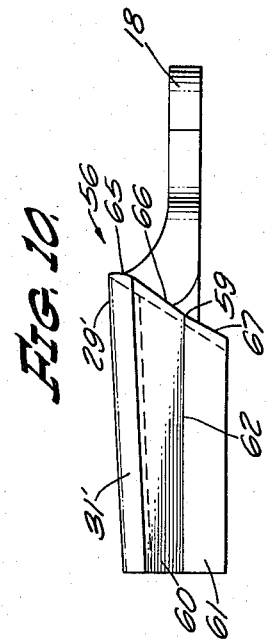
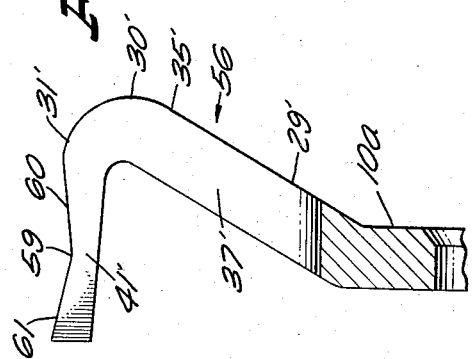
WILLIAM L. GASNER
INVENTOR.
WHANN & McMANIGAL
Attorneys for Applicant April 9, 1968 W. L. GASNER 3,376,906
ROUTER CUTTER WITH RELIEVED OUTER TOE SURFACE
Filed Feb. 15, 1966 2 Sheets-Sheet 2
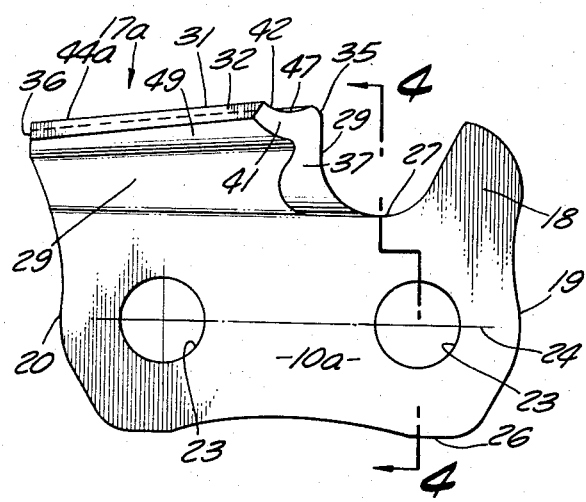
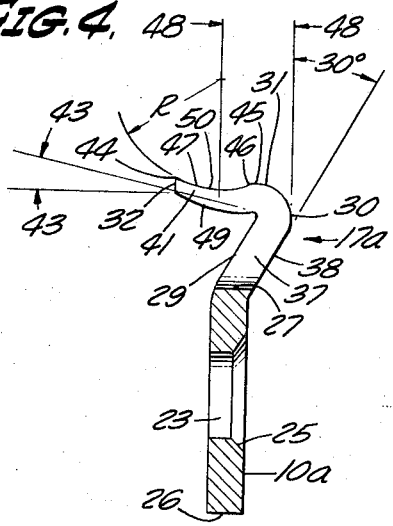
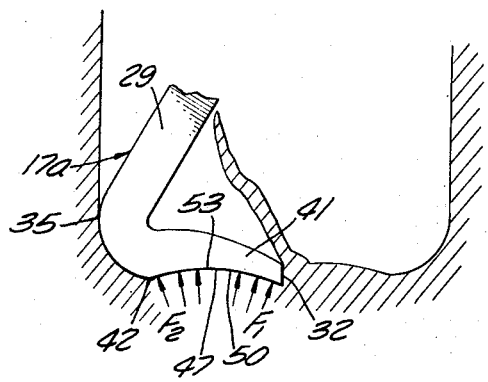
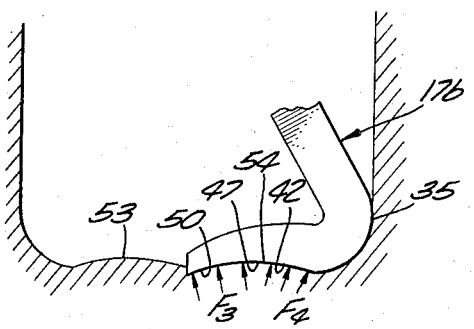
WILLIAM L. GASNER
INVENTOR.
WHANN & McMANIGAL
Attorneys for Applicant
BY 000000
United States Patent Office 3,376,906
Patented Apr. 9, 1968

3,376,906
ROUTER CUTTER WITH RELIEVED
OUTER TOE SURFACE
William L. Gasner, Gardena, Calif., assignor to
McCulloch Corporation, Los Angeles, Calif.,
a corporation of Wisconsin
Filed Feb. 15, 1966, Ser. No. 527,611
7 Claims. (Cl. 143—135)

ABSTRACT OF THE DISCLOSURE

A chain saw cutter including a planar mounting plate portion, a shank portion extending away from and deflected laterally of this plate portion, and a toe portion. The toe portion extends from the shank portion and is directed generally back toward and over the mounting plate portion so as to extend transversely of this mounting plate portion. Cutter surface means is carried by these shank and toe portions. The toe portion includes a side facing away from the mounting plate portion. The cutter is characterized by first and second stabilizing surface means, both of which are formed on the aforesaid toe portion side and extend longitudinally of the toe portion. The first stabilizing surface means extends in one direction generally transversely of a plane parallel to the mounting plate portion. This first stabilizing surface means generally converges with the aforesaid reference plane in a direction facing generally toward the mounting plate portion. The second stabilizing surface means extends in a direction generally opposite to the aforesaid one direction and transversely of the reference plane. The second stabilizing surface means converges with the reference plane in a direction facing generally toward the mounting plate portion. Both the first and second stabilizing surface means converge toward the reference plane in a direction facing generally toward the mounting plate portion.

Objects and summary of invention

This invention relates to flexible conveyors for cutters, such as saw chains, and more particularly, to cutters for mounting on chains, bands and cables.

The invention includes an improved router cutter having a relieved or recessed portion in the outer surface of the toe. It is an object of the present invention to provide an improved router cutter and an improved saw chain.

It is another object of the invention to provide a saw chain or other cutter conveyor, in which the cutting elements are individually stabilized against lateral movement and which in turn stabilize the saw chain against lateral movement in the kerf. The relieved portion in the toe of each cutting element forms a ridge in the kerf causing the relieved portion to follow the ridge as it is formed and as the cutter advances.

It is still another object of the invention to provide an improved router cutter which has a concavely curved or recessed cutting edge having a slicing cutting action rather than a wedging action in the kerf. The curved cutting edge severs end fibers in the kerf rather than separating them in accordance with the action of cutters in the prior art. The prior art flat-top router cutter tend to move into the grain and to follow it as it varies from deep to shallow. In contrast, the present invention provides complete cutting action and not a splitting of the wood.

It is a further object of the invention to provide a cutter for saw chains, or other cutter conveyors, referred to in the preceding paragraphs, and in which the curved or recessed cutting edge on the toe comprises a longer cutting edge then if the toe had a flat top. This longer cutting edge increases the sharpness life.

It is a still further object of the invention to provide a saw chain having cutting elements, referred to in the preceding paragraphs, which are longitudinally stabilized against porpoising. Since the cutters according to the present invention cut in a knifing action rather than a wedging action, there is little or no porpoising of the individual cutters in the kerf.

It is another object of the invention to provide a faster boring saw chain, having cutters referred to in the preceding paragraphs, and in which the boring speed is increased without lowering the depth gauge. In the prior art where a depth gauge setting would be, for example, 0.030" for ordinary cutting, the setting for boring would be 0.040". With the present invention, high speed boring is achieved with the ordinary depth gauge setting.

It is still another object of the invention to provide a saw chain, referred to in the preceding paragraphs, in which the cutters have improved self-feeding against the wall of the kerf. The relieved portion in the toe follows the ridge formed thereby and this holds the cutter into the wall so as to reduce skidding and roughness at the kerf wall. This is particularly true of the finishing cut made the second of two allochirally arranged cutters.

It is a further object of the invention to provide improved cutting elements, referred to in the preceding paragraphs, which are more easily sharpened by filing than the prior art cutters. Cutters according to the present invention are particularly easier to sharpen by filing by an inexperienced operator because he can see from the top when he has a sharp edge while he is filing without stopping to otherwise determine the sharpness. The reason for this is that the concave or recessed cutting edge on the toe reaches its maximum concavity or recess when it is sharpened properly and this may be easily seen while looking down on the cutter during the filing operation. In the prior art cutters, the sharpness of the toe cutting edge cannot be determined by looking down upon it during the filing.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes:

FIG. 1 is a top plan view of a section of saw chain having router cutters according to the invention;

FIG. 2 is a side elevational view of the saw chain shown in FIG. 1;

FIG. 3 is an enlarged view of a side link plate and a left-hand side cutter of the chain as shown in FIGS. 1 and 2;

FIG. 4 is a partially cross-sectioned view, taken substantially as indicated by the line 4—4 in FIG. 3.

FIG. 5 is an enlarged top plan view of the side cutter shown in FIG. 3;

FIG. 6 is a rear end view of the left-hand side cutter shown in FIG. 3;

FIG. 7 is a view of a first cut in a kerf made by the leading cutter of a sequence of two cutters;

FIG. 8 is a view of a cut made by the second of finishing cutter in the sequence in the kerf shown in FIG. 7;

FIG. 9 is a fragmentary end view of a left side link plate and a side cutter illustrating another embodiment of the invention; and FIG. 10 is a top plan view of the cutter and its depth gauge of the embodiment of the invention shown in FIG. 9.

Referring again to the drawings, there is shown in FIGS. 1 and 2 a saw chain according to the invention. The chain is comprised of laterally spaced pairs of side link plates 10 hingedly connected to alternately arranged center link plates 11 by means of pintles 12. Extending inwardly, or downwardly in FIG. 2, from the center links are projections or tangs 13 adapted to be engaged by a driving sprocket on a chain saw.

On selected side links 10a and 10b are respective left and right-hand cutters 17a and 17b, identical with each other but in allochiral relationship. Extending outwardly from each of the selected side links forwardly of the cutters is a depth gauge 18, about 0.030" shorter than the height of the highest point on the cutters.

In FIGS. 3–6, there are shown an enlarged side link plate 10a and a side cutter 17a, having a depth gauge 18. The link plate 10a is shown to be positioned vertically, having a forward end 19 and a rearward end 20. Spaced apart and extending through the side link plate are a pair of pintle openings 23, each having a diameter of about 0.125", the centers of which are on the horizontal plane 24 of the chain. Dimensions are being given not to limit the invention, but to give detailed information on one form of the invention. The distance between the centers of the openings 23 is about 0.383" and the distance of the centers from the respective forward and rear ends 19, 20 of the link plate is about 0.153". Outwardly of each opening 23 is a conical-shaped opening 25, having a depth of about 0.017", the angle of the conical surface being about 70° with the horizontal. The thickness of the link plate is about 0.050" and the height thereof from the lowest surface 26 to the upper surface 27 is about 0.321".

As best seen in FIG. 4, extending vertically and laterally outwardly from the link plate, at an angle of about 30°, is a shank portion 29. The shank portion extends vertically above the surface 27 to the point indicated at 30, a vertical distance of about 0.118". Extending transversely inwardly from the top of the shank portion at the point 30 is a toe portion 31. The toe is curved at an outside radius of about 0.050" from the point 30 and extends transversely from the latter point a distance of about 0.165" to its inner edge 32, and the longitudinal length of the toe from its leading edge 35 to its rearward edge 36 is about 0.437".

The shank has a beveled front face 37 trailing rearwardly from a leading edge 38, which forms the shank cutting edge, at an angle of about 30 or 35°. The toe 31 has a beveled front face 41, forming a continuous surface with the face 37. The toe has a leading cutting edge 42, forming a continuous cutting edge with the edge 38. The bevels 37 and 41 are formed at an angle of 30 or 35° with the longitudinal direction of the chain with a grinding wheel having flat sides and a cylindrical circumferential edge. The cutting edges may also be formed and sharpened with a cylindrical file. The angle of the bevel 41 is about 30° from the vertical.

The toe 31 is tilted upwardly from the horizontal as indicated by the arrows 43 at an angle of about 13°. The point 44 on the front end of the toe is the highest point thereof and an imaginary line through it and the point 45, the highest point and end of the curve, is at an angle of about 93°30'. The inner vertical edge of the toe 32 is approximately 0.024" in height. The top of the toe 31 is relieved and has a grooved surface 47, extending longitudinally for the full length thereof, and is concavely shaped in the transverse direction so as to form a cylindrical groove, extending transversely from a line 44a on the top of the edge 32 to a line 46a, extending longitudinally from a point 46 on the toe cutting edge. The line 46a is substantially parallel to the shank portion trailing from the point 30 and is above the link plate. The center of the cylindrical surface is spaced a distance, as indicated by the arrows 48, transversely inwardly from the point 30 approximately 0.100" and the radius of the surface 47 is 0.156", indicated by the letter R. The depth of the groove of the surface 47, measured downwardly from a straight line through the points 44 and 45, is about 0.010".

Directly below the surface 47 is a convex cylindrical undersurface 49 of the toe, extending substantially in the same transverse direction as the surface 47 but not being concentric therewith. The configurations of the surfaces 47 and 49 are made with a die, but the surface 47 can also be machined, in which case the surface 49 would be flat. Because of the concavity of the surface 47, when the toe cutting edge 42 is formed by grinding or with a file, the part thereof which is formed along the transverse portion of the surface 47, designated as 50, is concavely curved to provide a longer toe cutting edge than would exist if the entire toe cutting edge were straight. The entire toe portion 31 trails inwardly toward the shank from the leading edge at an angle of approximately 7° and the shank portion 29 trails laterally inwardly from the point 30, as shown in FIG. 4, at an angle of about 3°.

In FIG. 7 and 8, the cutting action of a pair of left and right-hand cutters is shown, left and right being determined as the kerf would be viewed at the underside of the chain saw bar and from the chain saw engine. As the first cut is made, as shown in FIG. 7 with the cutter according to the present invention, a convex ridge 53 is cut into the kerf bottom so as to conform to the transverse concavity of the toe cutting edge and the surface 47, trailing the latter edge, follows the ridge 53 so as to stabilize the cutter 17a against lateral movement, as indicated by the forces $F_1$, $F_2$. Similarly, as may be seen in FIG. 8, the concave surface 47 in the cutter 17b follows a second convex ridge surface 54 cut by the cutting edge portion 50 on the toe, the toe of the cutting edge 17b overlapping the ridge 53. Here again, as indicated by the force arrows $F_3$ and $F_4$, the toe portions are stabilized against lateral movement. Thus, the forces $F_1$, $F_2$ are balanced against each other, as are the forces $F_3$, $F_4$ to prevent lateral movement of the individual cutters and the saw chain.

In the prior art where the outer toe surfaces were flat so that ridges, such as 53 and 54, would not have been formed, the resulting force action on the individual cutters was such to prevent them from being stabilized. Thus, in FIG. 7, for example, where the first cut is being made there would with the prior art cutters, be a resultant force to the left caused by the toe edge 32 against the uncut portion of the chip and by the angle of the toe cutting edge which would tend to cause the cutter to dig into the wall of the kerf on the left side of FIG. 7.

When prior art cutters are used in the finishing cut, as shown in FIG. 8, there is no significant force on the cutter to the right caused by an uncut chip, although there is a force to the right in a prior art finishing cutter in the position shown in FIG. 8 caused by the toe angle. If this angle is not at its optimum and the cutter is not at its sharpest, there is a tendency in the prior art cutters to skid inwardly off the side wall to cause roughness and reduced efficiency.

Another embodiment of the invention is shown in FIGS. 9 and 10 in the form of a cutter, generally designated as 56. This cutter is substantially the same as the cutters 17a, 17b, the difference being in the relieved or grooved outer toe surface and in the toe cutting edge formed at the forward end of the relieved toe surface. Here, the shank 29' extends laterally outwardly from a link plate 10a and a toe 31' extends transversely inwardly over the link plate in the same manner as does the toe 31 in FIG. 4. A front, beveled face 37' of the shank trails laterally inwardly from the leading or cutting edge 35' of the shank and the surface 37' is continuous with a beveled toe surface 41'. These bevels are filled or ground at the same angles as those indicated in FIGS. 3, 4 and 5.

As shown in FIG. 4, the low point of the relieved surface 47 is approximately directly vertically below the center of the arc of the surface and in FIG. 9, a low point 59 is at the same relative location, that is, about 0.100" horizontally or transversely from the point 30'. The toe 31' has its least thickness directly below the point 59, which is approximately half the thickness of the link plate.

In this embodiment, the outer portion of the toe is relieved approximately the same amount as that of the toe 41 in FIG. 4. Here, the relieved portion of the toe is formed of two plane surfaces 60 and 61 which adjoin each other in a straight line 62, extending longitudinally rearwardly from the point 59. The angle formed by the surfaces 60 and 61, as shown in FIG. 9, is approximately 163°. Each of the surfaces 60 and 61 are at substantially the same angle from the vertical. As may be seen in FIG. 10, the toe cutting edge is comprised of a curved portion 65, a first straight edge 66 and a second straight edge 67. The angle formed by the edges 66 and 67 results from the relieving of the outer portion of the toe, down to the low point 59, and is formed as the front face of the toe is beveled by sharpening with a grinding wheel or file. As a result of the relieving of the outer toe portion, the toe cutting edge is lengthened, similarly to that of the toe cutting edge shown in FIG. 5.

In forming the kerf, the cutter, as shown in FIGS. 9 and 10, forms a ridge in the kerf bottom having flat surfaces so as to mate with the surfaces 60, 61 and at the same angle to produce the substantially same stabilizing results on the cutters and chain as indicated in FIGS. 7 and 8.

The cutters shown and described can also be used on saw bands and cables. For such uses, the mounting plates are substantially shorter than the chain side links so that the cutters extend outwardly approximately the same distance on the band or cable as they do from the saw chain illustrated.

The terms "relieved," "grooved," "recessed," and "concave," referred to in describing the outer surface, as 47, of the toe portion 31 or 31', mean the configuration which, along with the toe cutting edge, that forms a ridge in the kerf bottom that produces resultant forces on the toe to stabilize the cutter against lateral movement.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims, wherein various portions have been separated for clarity of reading and not for emphasis.

I claim:

1. A cutter for use on a flexible conveyor, said cutter comprising:
    (a) a vertical mounting plate portion having a forward and a rearward end, said plate portion having an outer vertical surface;
    (b) a shank portion extending vertically and laterally outwardly from said plate, said shank portion having an outer surface extending from said vertical outer surface of said plate portion;
    (c) a toe portion extending from the outer part of said shank portion, extending laterally inwardly and transversely over and beyond said plate, and terminating in a free end, said toe portion having an outer surface facing away from said mounting plate and being continuous from the outer surface of said shank portion;
    (d) a continuous cutting edge on the forward end of said shank and toe portions coinciding with the outer surface of said toe and shank portions;
    (e) first stabilizing surface means extending generally longitudinally of said toe portion, formed on outer surface of said toe portion, and extending in one direction generally transversely of a plane parallel to said mounting plate portion, said plane being positioned between the vertical extremities of said mounting plate, said first stabilizing surface means generally converging with said plane in a direction facing generally toward said mounting plate portion;
    (f) second stabilizing surface means extending generally longitudinally of said toe portion, formed on outer surface of said toe portion, and extending in a direction generally opposite to said one direction and transversely of said plane, said second stabilizing surface means generally converging with said plane in a direction facing generally toward said mounting plate portion;
    (g) said first and second stabilizing surface means converging toward said plane in a direction facing generally toward said mounting plate portion.

2. A cutter as described in claim 1:
    wherein each of said first and second stabilizing surface means comprises flat, planar surface portions.

3. A cutter as described in claim 1:
    wherein each of said first and second stabilizing surface means comprises a cylindrical curved surface portion, with said first stabilizing surface means comprising a cylindrical continuation of said second stabilizing surface means.

4. A cutter for mounting on a flexible conveyor, comprising:
    (a) a vertical mounting plate having a forward and a rearward end;
    (b) a shank portion extending vertically and laterally outwardly from said plate;
    (c) a toe portion extending from the outer part of said shank portion and extending laterally inwardly and transversely over and beyond said plate, terminating in a free end;
    (d) a continuous cutting edge on the forward end of said shank and toe portions; and
    (e) a relieved outer, longitudinally directed portion on said toe portion extending from said forward end to the rearward end thereof, and facing vertically upwardly from said toe portion;
    (f) said relieved outer portion having a longitudinally directed bottom extending for the full length thereof;
    (g) said bottom being spaced between two longitudinally directed upper portions forming the transverse extremities of said relieved portion;
    (h) one of said extremities being adjacent said free end of said toe portion;
    (i) said cutting edge comprising a leading edge on said shank and toe portions formed on forward bevel surfaces thereof and trailing inwardly from the cutting edge;
    (j) said cutting edge on the toe trailing from the shank portion at an acute angle with the plate;
    (k) said shank portion trailing laterally inwardly and said toe portion trailing inwardly toward said plate; and
    (l) said relieved portion being a transverse concave surface.

5. The invention according to claim 4 in which:
    said concave surface is cylindrical having its center in a longitudinally directed line vertically above said plate and in approximate alignment therewith.

6. The invention according to claim 5 including:
    (a) an inner longitudinally directed undersurface on said toe portion approximately conforming to said relieved outer portion,
    (b) said undersurface being transverse and convexly cylindrical having its center in a longitudinally directed line vertically above said plate and in alignment therewith,
    (c) said last center being transversely between said center of said concave surface and a vertical extension of said shank portion,
    (d) said toe portion being tapered away from said shank portion over said plate and to its free end,
    (e) said cutting edge on said toe portion at the forward end of said concave cylindrical surface being concave.

7. The invention according to claim 6 in which: the other of said transverse extremities of said relieved portion extends longitudinally along a line on the outer surface of said toe portion vertically above said plate and laterally inwardly of a substantial part of the shank portion.

References Cited

UNITED STATES PATENTS

| | | | |
|---|---|---|---|
| 2,730,143 | 1/1956 | Ryde | 143—135 |
| 3,155,129 | 11/1964 | Edmunson | 143—135 |

DONALD R. SCHRAN, *Primary Examiner.*